US008888114B2

(12) United States Patent
Bellerose et al.

(10) Patent No.: US 8,888,114 B2
(45) Date of Patent: Nov. 18, 2014

(54) PRECONSTRAINED TORSION SUSPENSION ASSEMBLY, E.G. FOR A TRAILER

(71) Applicant: Mayer Integration Inc., Valcourt (CA)

(72) Inventors: Rene Bellerose, Valcourt (CA); Claude Mayer, Valcourt (CA)

(73) Assignee: Mayer Integration Inc., Valcourt, Quebec (CA)

(*) Notice: Subject to any disclaimer, the term of this patent is extended or adjusted under 35 U.S.C. 154(b) by 0 days.

(21) Appl. No.: 14/044,142

(22) Filed: Oct. 2, 2013

(65) Prior Publication Data

US 2014/0091549 A1    Apr. 3, 2014

Related U.S. Application Data

(60) Provisional application No. 61/708,809, filed on Oct. 2, 2012.

(51) Int. Cl.
| | |
|---|---|
| *B60G 11/23* | (2006.01) |
| *B60G 11/18* | (2006.01) |
| *B60G 11/22* | (2006.01) |
| *F16F 1/54* | (2006.01) |

(52) U.S. Cl.
CPC ............ *B60G 11/183* (2013.01); *B60G 11/225* (2013.01); *F16F 1/545* (2013.01); *B60G 2300/04* (2013.01); *B60G 2202/142* (2013.01)
USPC ............................... 280/124.166; 280/124.13

(58) Field of Classification Search
USPC ...................... 280/124.13, 124.166, 124.149, 280/124.169, 789, 684
See application file for complete search history.

(56) References Cited

U.S. PATENT DOCUMENTS

| | | | | |
|---|---|---|---|---|
| 2,773,699 | A * | 12/1956 | Grumman ................ | 280/124.13 |
| 3,085,817 | A * | 4/1963 | Krause et al. ............. | 280/5.508 |
| 3,706,481 | A * | 12/1972 | Kramer ...................... | 305/134 |
| 3,820,813 | A * | 6/1974 | Moulton et al. ......... | 280/124.13 |
| 4,921,231 | A * | 5/1990 | Reynolds et al. ........... | 267/196 |
| 5,277,450 | A * | 1/1994 | Henschen ................. | 280/6.151 |
| 5,326,128 | A * | 7/1994 | Cromley, Jr. ............... | 280/656 |
| 6,752,411 | B2 * | 6/2004 | Few ...................... | 280/124.169 |
| 6,905,130 | B2 * | 6/2005 | Few ...................... | 280/124.169 |
| 8,083,245 | B2 * | 12/2011 | Hatzikakidis .......... | 280/124.128 |
| 8,191,911 | B1 * | 6/2012 | Reynolds ............... | 280/124.166 |
| 8,641,079 | B2 * | 2/2014 | Dunlap et al. ............... | 280/684 |
| 2012/0211957 | A1 * | 8/2012 | Revelino et al. ............. | 280/104 |

* cited by examiner

*Primary Examiner* — Drew Brown
(74) *Attorney, Agent, or Firm* — Norton Rose Fulbright Canada LLP (57) ABSTRACT

A torsion suspension assembly comprises a first housing and a first biasing body within the first housing, a second housing and at least a second biasing body within the second housing. A shaft has a first end supporting a suspension arm adapted to support a wheel or wheel assembly, an elongated body of the shaft operatively within both the first biasing body and the second biasing body. A preconstraining arrangement is provided such that the shaft is in an equilibrium condition when the first biasing body and the second biasing body apply opposite torsion forces on the shaft.

8 Claims, 8 Drawing Sheets

PRECONSTRAINED TORSION SUSPENSION ASSEMBLY, E.G. FOR A TRAILER

CROSS-REFERENCE TO RELATED APPLICATION

The present application claims priority on U.S. Provisional Patent Application Ser. No. 61/708,809, filed on Oct. 2, 2012.

TECHNICAL FIELD

The present application relates to a torsion suspension of the type used for instance in trailers.

BACKGROUND OF THE ART

Torsion suspensions (a.k.a, torsion spring suspensions, torsion bar suspensions, etc.) are commonly used in vehicles such as trailers. Torsion suspensions are relatively simple, lightweight and cost efficient and are hence well suited to be used in some trailers towed by vehicles. A torsion suspension unit typically comprises a housing by which the torsion suspension unit is secured to the trailer. A shaft (a.k.a., a torsion bar) has a portion within the housing and another portion projecting out of the housing. The wheels of the vehicle are connected to an arm that is integrally connected to the shaft, the arm (a.k.a., lever) being at a right angle relative to the shaft (or quasi right angle). The portion of the shaft that is in the housing is received in a body of rubber or like resilient material. The shaft and the rubber are bonded or operatively connected, such that a rotation of the shaft will cause deformation of the rubber, which in turn produces torsion forces on the shaft. The rubber will want to return to its rest state, thereby biasing the shaft toward that position. The torsion effect of the rubber on the shaft is a damped oscillation, leading the shaft to reach an equilibrium state.

One issue related to the use of such torsion suspensions is that the systems rely on the elasticity of the rubber to perform the act of suspension. If a trailer is for instance overloaded, the rubber may be ineffective in damping the oscillations and returning the trailer to an equilibrium state.

SUMMARY

It is an aim of the present disclosure to provide a torsion suspension that addresses issues related to the prior art.

Therefore, in accordance with a first embodiment, there is provided a torsion suspension assembly comprising: a first housing; at least a first biasing body within the first housing; a second housing; at least a second biasing body within the second housing; a shaft having a first end supporting a suspension arm adapted to support a wheel or wheel assembly, an elongated body of the shaft operatively within both the first biasing body and the second biasing body; and a preconstraining arrangement such that the shaft is in an equilibrium condition when the first biasing body and the second biasing body apply opposite torsion forces on the shaft.

In accordance with a second embodiment, there is provided a torsion suspension assembly comprising: at least a biasing body; a shaft having a first end supporting a suspension arm adapted to support a wheel or wheel assembly, an elongated body of the shaft operatively within the biasing body; and at least one housing having a twisted body along a longitudinal direction to receive the biasing body therein such that the shaft is in an equilibrium condition when received in the longitudinal direction of the housing, the equilibrium condition having a first section and a second section of the biasing body apply opposite torsion forces on the shaft as preconstrained by the twisted body of the housing.

DETAILED DESCRIPTION

Figure 1:
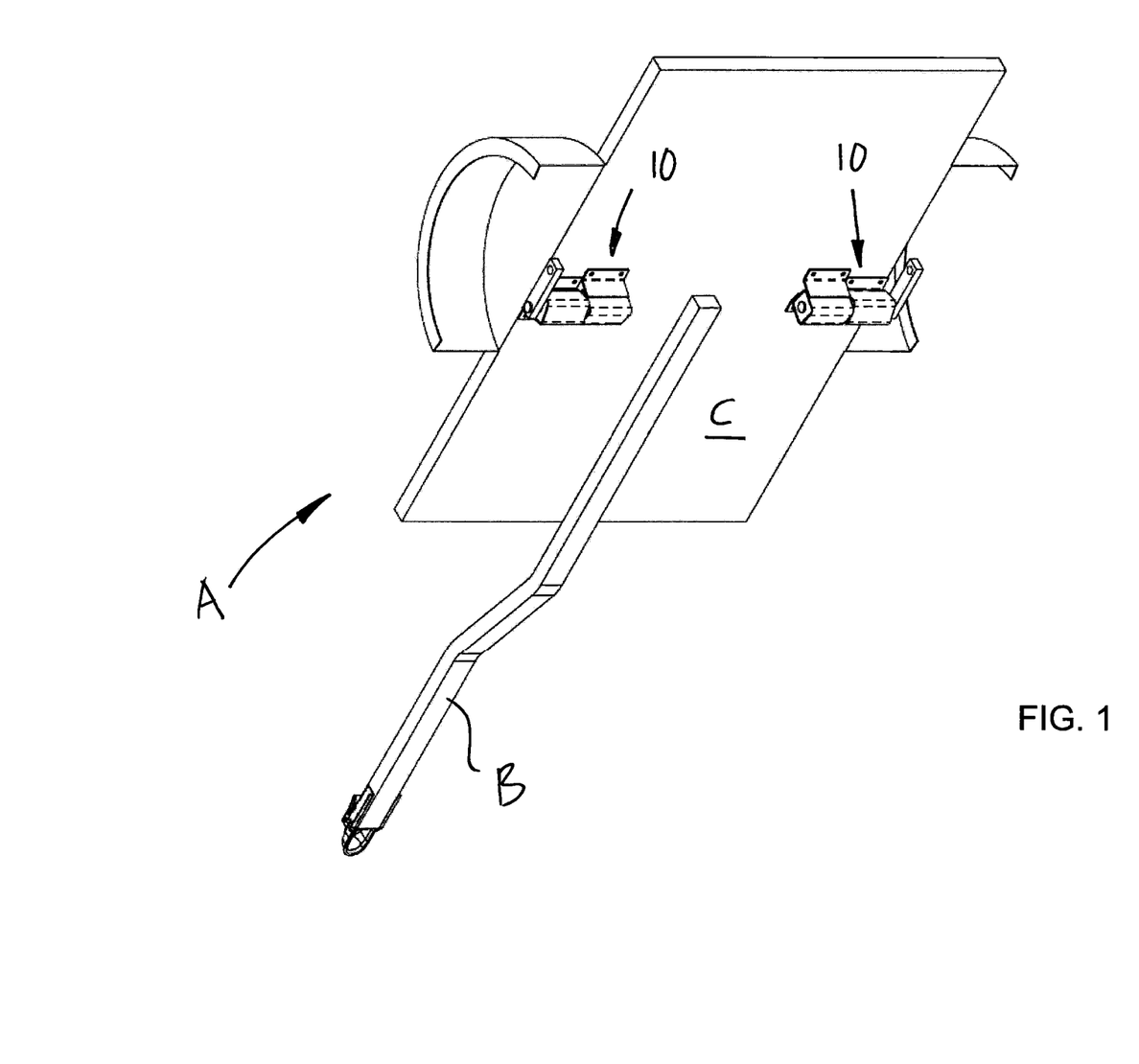
FIG. 1 is a perspective view of a trailer with a torsion suspension assembly in accordance with a first embodiment of the present disclosure.
Figure 2:
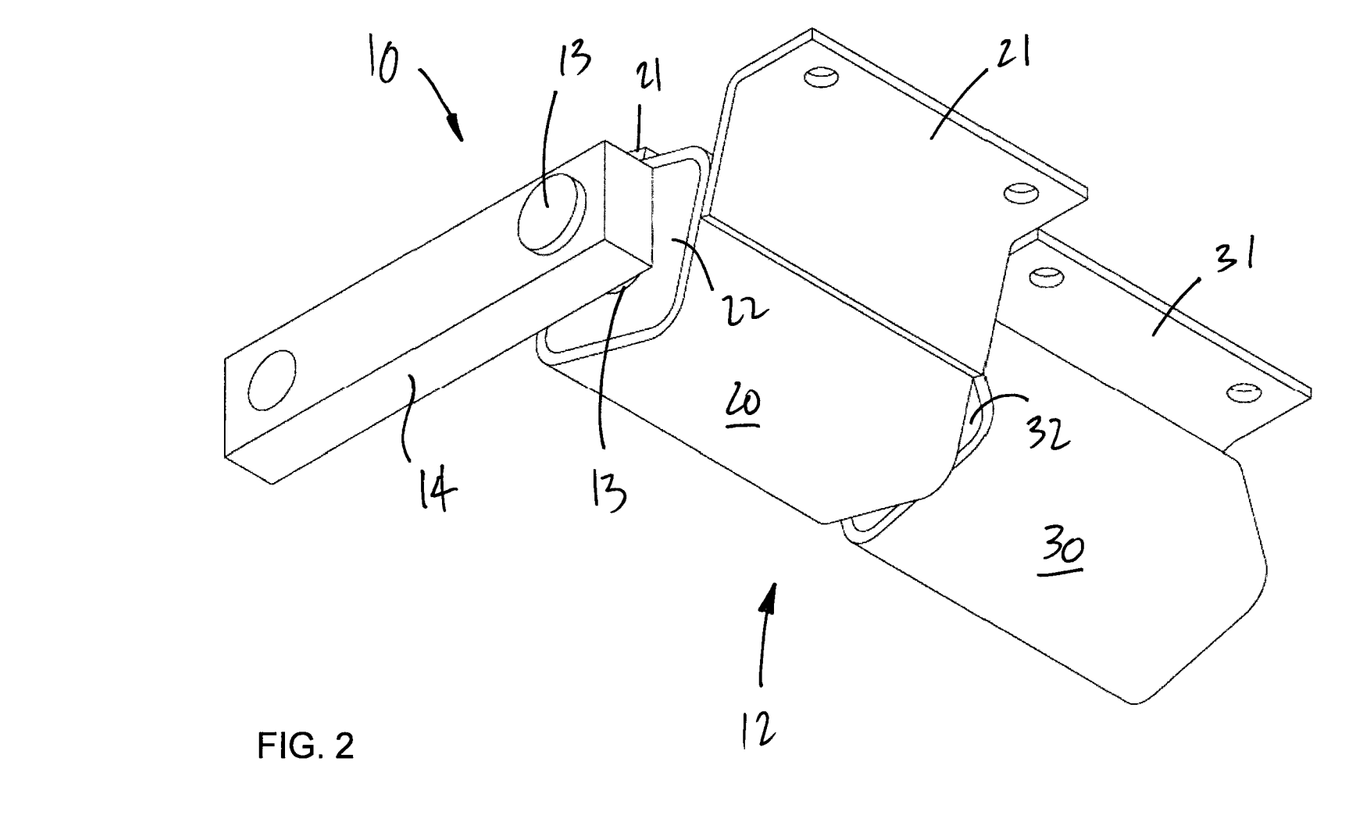
FIG. 2 is a perspective view of the torsion suspension assembly of FIG. 1.
Figure 3:
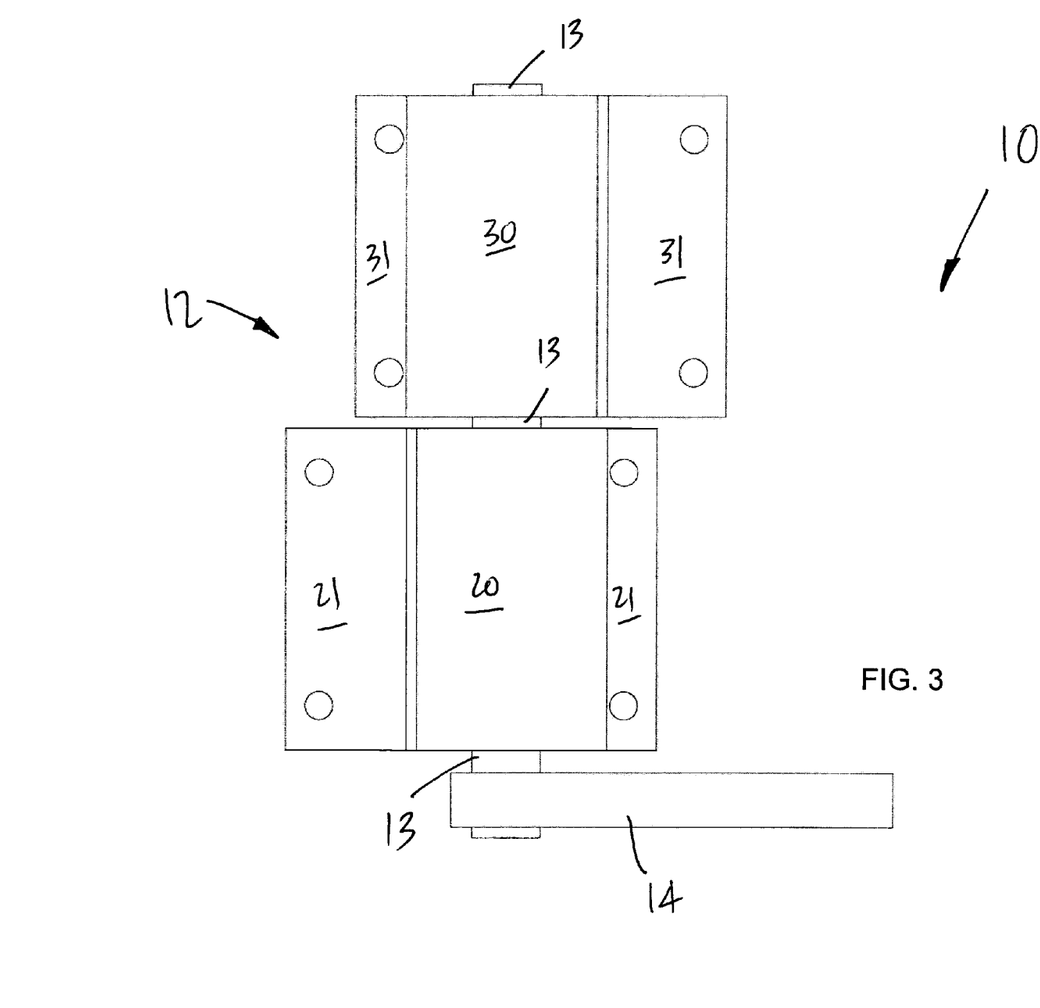
FIG. 3 is a bottom plan view of the torsion suspension assembly of FIG. 1.
Figure 4:
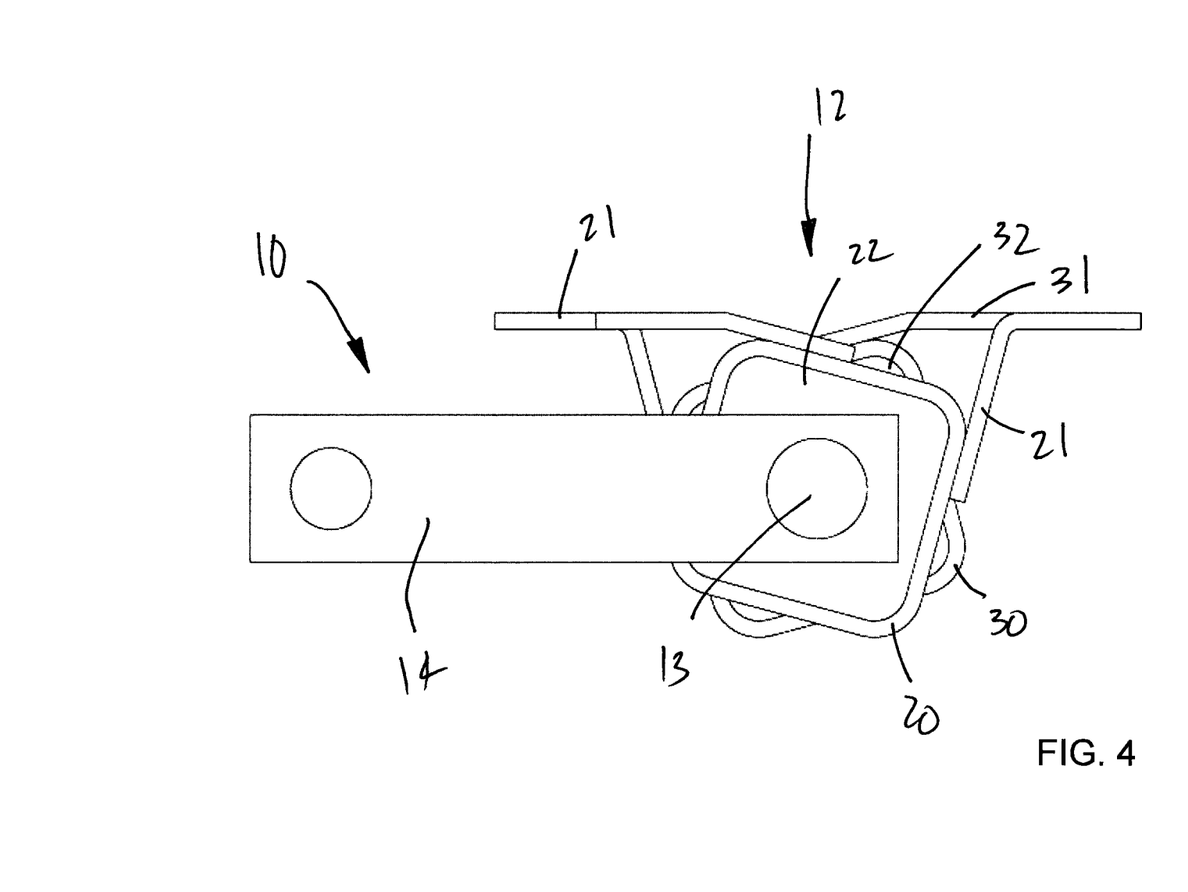
FIG. 4 is a side elevation view of the torsion suspension assembly of FIG. 1.

Referring to the drawings and more particularly to FIG. 1, there is illustrated in a first embodiment a trailer A with wheels removed and with a hitch arm B projecting forward. The trailer is typically connected to a towing vehicle by the hitch arm B. The trailer A comprises a structure C, illustrated as being a platform. However, the structure C may be embodied in many different ways such as a structure of tubes, a frame, etc. Moreover, the trailer may be of any appropriate type, with numerous sets of wheels, axles, etc.

A torsion suspension assembly in accordance with a first embodiment is generally shown at 10. The trailer A features two torsion suspension assemblies 10, both secured to an underside of the structure C, on opposite sides of the trailer A, although the assemblies 10 could be connected in other ways to the trailer A (e.g., upperside of the structure C). Hence, each of the torsion suspension assembly 10 supports an axle (also referred to as spindle) upon which is mounted at least one wheel. In an embodiment, two or more co-axial wheels are on the axle. In yet another embodiment, the axle may support a carriage of fore-and-aft wheels. It is pointed out that the trailer A may have more than two of the torsion suspension assemblies 10. The torsion suspension assemblies 10, both shown in FIG. 1, may share a common shaft, as will be described hereinafter.

Referring to FIGS. 1 to 4, each torsion suspension assembly 10 has a suspension member 12 from which projects a shaft 13 (a.k.a. torsion bar). An arm 14 (a.k.a. lever) is rigidly connected to the shaft 13 to rotate therewith. The shaft 13 and the arm 14 may be integral, monolithic, welded, etc. The shaft 13 has a portion that extends within the suspension member 12 in a manner detailed hereinafter, and hence concealed from view in FIGS. 1-4.

The suspension member 12 comprises a first housing (the housing also known as a tube). The first housing is shown as being a straight tube of relatively square-section (quasi-square section, with flat surfaces and rounded corners), connected to the structure C by angular brackets 21, and like components. The relatively square-section may be for the inner cavity section shape and the outer shape as well. A biasing body 22 is located within the square-section straight tube 20 and is the interface between the housing 20 and a portion of the shaft 13 that extends within the housing 20, whereby the biasing body 22 defines an aperture for the shaft 13. The biasing bodies 22 and 32 are made of a resilient rubbery material, of natural or synthetic composition, such as rubber or like polymeric rubbery material. Hence, the biasing bodies 22 and 32 have a relatively high elastic deformation limit and are selected to operate within the elastic deformation range despite the forces applied thereon during a towing operation of the trailer.

The suspension member 12 comprises another set of housing, angular brackets and biasing body, essentially similar to the set illustrated as 20, 21 and 22 in the Figures, but labeled as 30, 31 and 32 to distinguish over the first set. Hence, the shaft 13 has a portion extending in both housings 20 and 30.

As the biasing bodies 22 and 32 will apply torsion forces on the shaft 13, there must be some operative connection between the shaft 13 and the biasing bodies 22 and 32. According to an embodiment, the shaft 13 has a circular cross-section, whereby the interconnection between the shaft 13 and the biasing bodies 22 and 32 must provide high adherence for the shaft 13 not to slip relative to the biasing bodies 22 and 32. According to an embodiment, the portion of the shaft 13 that is connected to the biasing bodies 22 and 32 has a relatively high friction coefficient on its surface, for instance by being sandblasted, or by having a like machined surface. An adhesive may then be used to bond the portion of the shaft 13 to the biasing bodies 22 and 32. According to an embodiment, the shaft 13 has a surface treatment and glue thereon prior to the overmolding of the biasing bodies 22 and 32 thereon. The combination of the shaft 13 and the biasing bodies 22 and 32 may then be force-fitted in the straight tube portions 20 and 30. In such an embodiment, the biasing bodies 22 and 32 have lateral surfaces parallel to one another at the end of the overmolding (forming an integrally connected assembly).

It is pointed out that the shaft 13 may have any appropriate sectional shape. In FIGS. 1 to 8, the shaft 13 is shown as being circular, but may be triangular, square, rectangular, oval, etc. Any appropriate section is considered. By having a non-circular section, the shaft 13 may not need to be glued to the biasing bodies 22 or 32. The biasing body 22 or 32 may also consist of a plurality of separate biasing units (or cords), as alternatives to the monolithic configurations of FIGS. 1-4. Hence, the use of the expression biasing body includes separate subbodies. In an embodiment, such cords have a triangular section, with the shaft having a square section.

It is observed from FIGS. 1 to 4 that, when installed to the structure C, the torsion suspension assemblies 10 have the straight tubes 20 and 30 rotationally offset with respect to one another (i.e. planar surfaces are not parallel). This rotational offset may be achieved when installing the suspension member 12 to the structure C. In the illustrated embodiment, the offsetting is achieved by having the angular brackets 21 and 31 of appropriate size and configuration. In another embodiment (not shown), the structure C may provide offset abutment surfaces for the straight tubes 20 and 30. Hence, the angular brackets 21 and 31 provide a preconstraining arrangement.

In producing this preconstraining arrangement, the biasing bodies 22 and 32 are away from their rest state (i.e., state in which each biasing body is in an equilibrium state in terms of applying torsion forces on the shaft). In the preconstraining arrangement, the biasing bodies 22 and 32 apply torsion forces in opposite orientations (one clockwise, the other counterclockwise). Therefore, to achieve the equilibrium condition of FIG. 1 (i.e., at which the arm 14 does not move), the biasing bodies 22 and 32 are both in a biasing state, i.e., applying torsion forces on the shaft 13. As the torsion forces applied by the biasing bodies 22 and 32 are in opposite orientations, the torsion forces cancel each other out to reach the equilibrium condition shown in FIG. 1. It is pointed out that the equilibrium condition shown in FIG. 1 may vary in terms of orientation of the arm 14 relative to the axis of rotation of the shaft 13, depending on the weight supported by the torsion suspension assemblies 10. In an embodiment, the trailer A is designed to carry loads that will have the equilibrium condition forcing the biasing bodies 22 and to oppose torsion forces of opposite orientations (i.e., one clockwise, the other counterclockwise). Hence, the torsion suspension assembly 10 is said to be preconstrained, as it will always have at least one of the biasing bodies 22 and 32 apply a torsion force, even when the suspension assembly 10 is in an equilibrium condition. In most instances, both biasing bodies 22 and 32 apply torsion forces simultaneously.

The preconstraining arrangement of the suspension assembly 10 is achieved by way of the brackets 21 and 31 that hold the biasing bodies 22 and 32 loaded in the equilibrium state, as the brackets 21 and 31 are secured to the structure C. However, other pieces of hardware could be used. For instance, the structure C could provide suitable supports to achieve the preconstraining arrangement of the suspension assembly 10.

It is pointed that the suspension members 12 on both sides of the trailer A may share the same shaft 13, although not shown in FIG. 1. Indeed, the shaft 13 may extend the full width of the structure C to be connected at opposed ends to the respective arms 14. In such a case, there may be a single pair of the square section straight tubes 20 and 30, or more than one of each square section straight tubes 20 and 30, provided the square section straight tubes 20 and 30 apply opposite torsion forces in the manner taught above. Bearings may be used to help maintain the shaft 13 fixed to the structure C.

Figure 5:
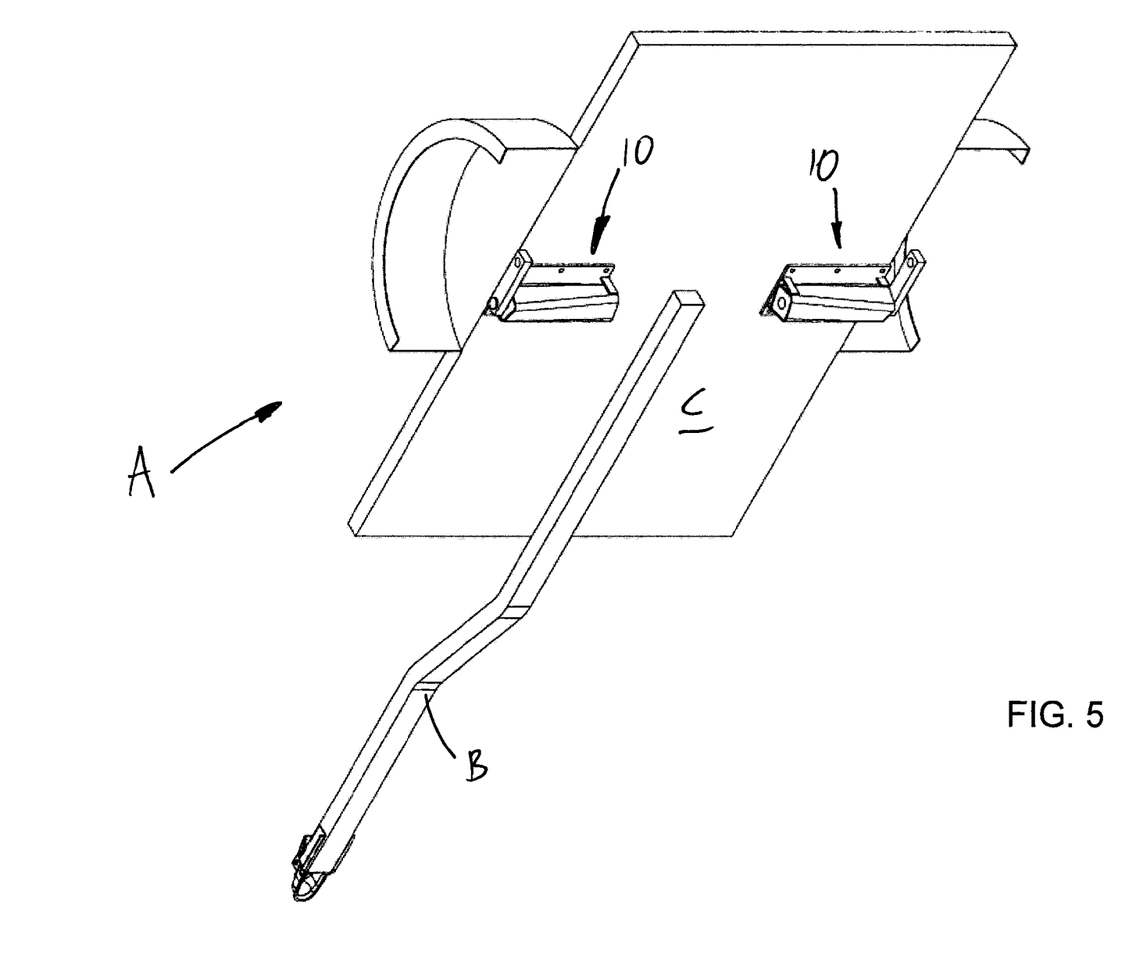
FIG. 5 is a perspective view of a trailer with a torsion suspension assembly in accordance with another embodiment of the present disclosure.
Figure 6:
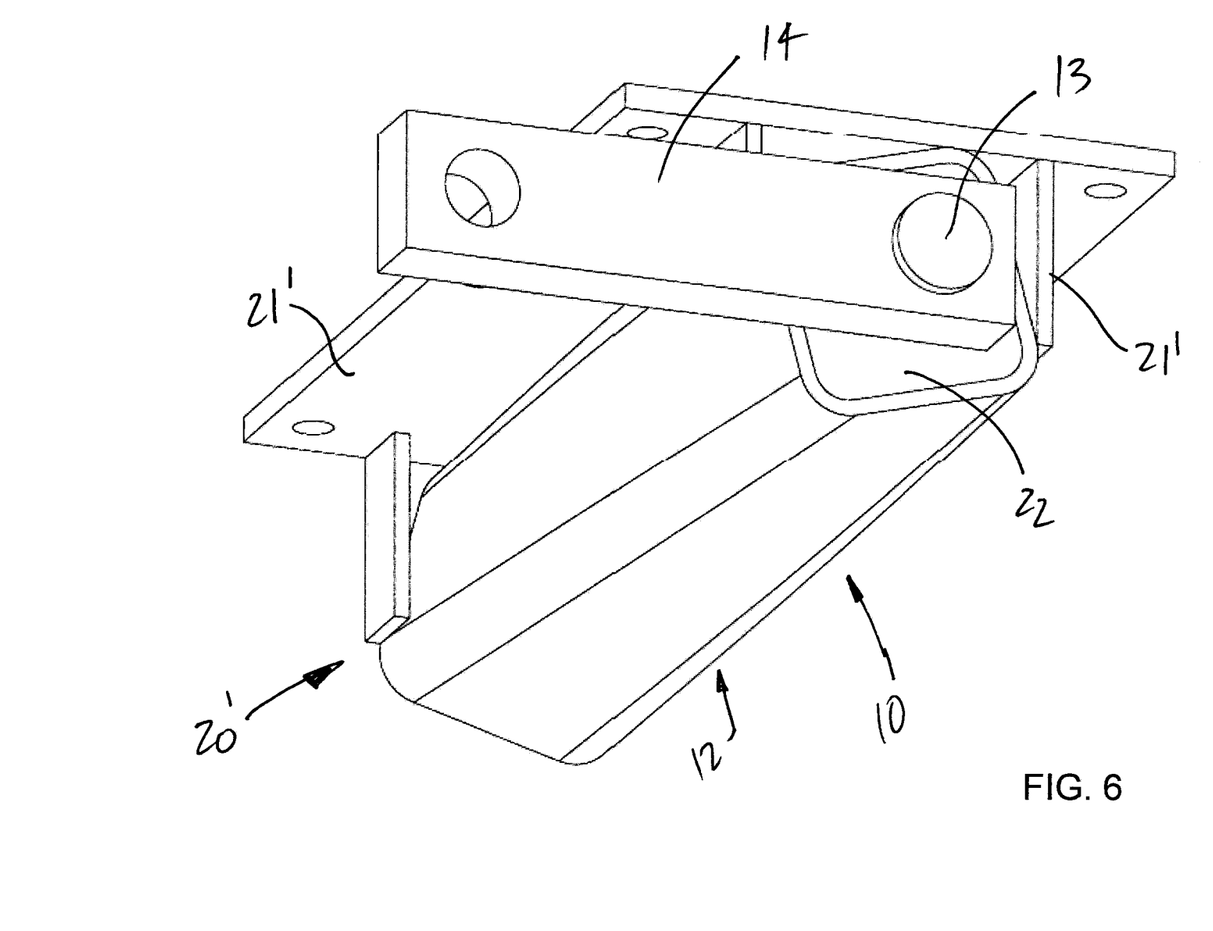
FIG. 6 is a perspective view of the torsion suspension assembly of FIG. 5.
Figure 7:
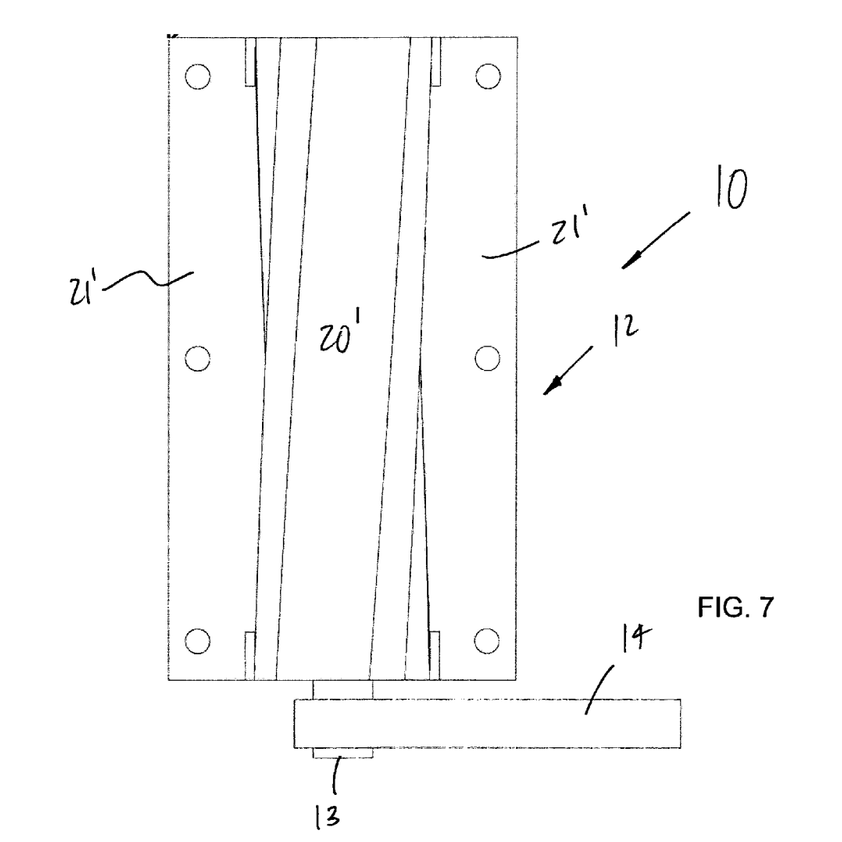
FIG. 7 is a bottom plan view of the torsion suspension assembly of FIG. 5.
Figure 8:
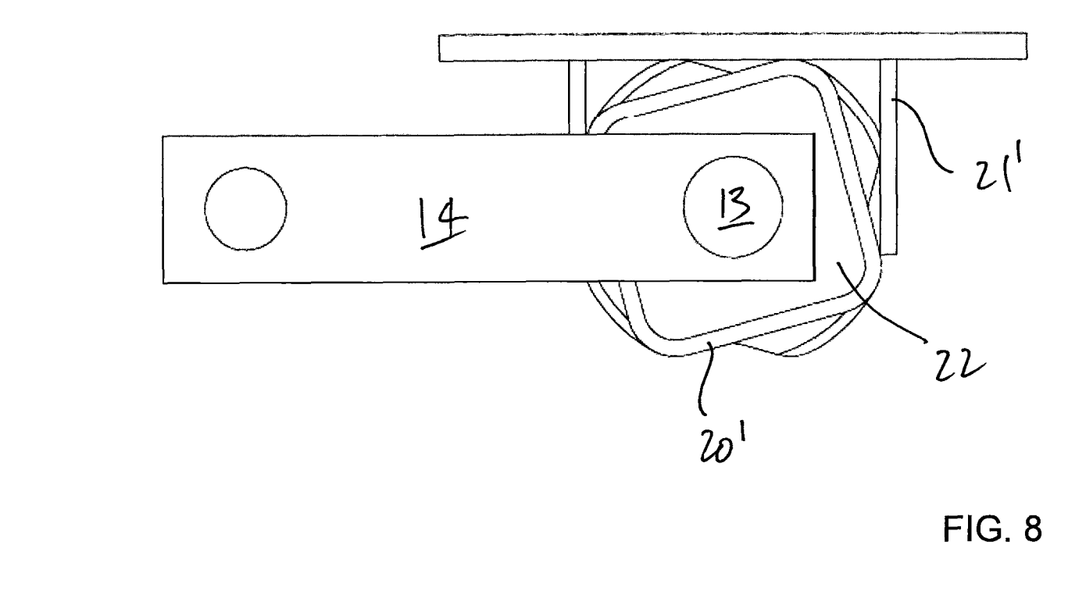
FIG. 8 is a side elevation view of the torsion suspension assembly of FIG. 5.

Referring to FIGS. 5 to 8, there is illustrated yet another embodiment of the present disclosure in which the suspension member 12 comprises a single tube 20', for instance of relatively square section as shown in FIG. 5 (e.g., generally square shape with rounded corners). However, the square section tube 20' has a twisted body along a longitudinal direction thereof, with appropriate support or bracket 21'. Accordingly, the biasing body 22 inserted in the square section twisted tube 20' will have different sections thereof in a biasing state, despite the torsion suspension member 12 being in an equilibrium condition. It is desired that one portion of the biasing body 22 apply a torsion force in one orientation (e.g., clockwise), while another portion of the same biasing body 22 apply a torsion force in the other orientation (e.g., counterclockwise), in the equilibrium condition. The square section tube 20' may be given its twisted shape through various bending/shaping treatments, and the biasing body 22 may be force-fitted into the square section tube 20'. Moreover, in similar fashion to the embodiment of FIGS. 1-4, a structural bond is formed between the shaft 13 and the biasing body 22, in the manner described above, for torsion forces to be transmitted from the biasing body 22 to the shaft 13 without slippage.

In the embodiment of FIGS. 5 to 8, there may be a single tube 20' and biasing body 22 extending from one arm 14 to the other arm 14. In such a case, there may be a single one of the shafts 13 for both arms 14, or a shared shaft 13. A similar combination may be used for the embodiment of FIGS. 1 to 4, for instance by having two shafts 13 for a set of two housings 20 and one elongated housing 30 (or vice versa). Any appropriate combination may be used.

The invention claimed is:

1. A torsion suspension assembly comprising:
a first housing;
at least a first biasing body within the first housing;
a second housing;
at least a second biasing body within the second housing;
a shaft having a first end supporting a suspension arm adapted to support a wheel or wheel assembly, an elongated body of the shaft operatively within both the first biasing body and the second biasing body; and
a preconstraining arrangement such that the shaft is in an equilibrium condition when the first biasing body and the second biasing body apply opposite torsion forces on the shaft.

2. The torsion suspension assembly according to claim 1, wherein the elongated body of the shaft has a circular section received in corresponding apertures in the first biasing body and the second biasing body, the elongated body of the shaft being integrally bonded to the first biasing body and the second biasing body.

3. The torsion suspension assembly according to claim 2, wherein the elongated body of the shaft has surface treatment to increase the integral bond with the first biasing body and the second biasing body.

4. The torsion suspension assembly according to claim 2, wherein the first biasing body and the second biasing body each have a generally square outer shape, and further wherein both the first housing and the second housing have a complementary inner cavity shape.

5. The torsion suspension assembly according to claim 1, wherein the elongated shaft and the first biasing body and the second biasing body are an integrally connected assembly, and further wherein the integrally connected assembly is force-fitted into the first housing and the second housing.

6. The torsion suspension assembly according to claim 1, wherein the preconstraining arrangement comprises angular brackets respectively connected to the first housing and the second housing, the angular brackets adapted secure the first housing and the second housing to a structure such that the first housing and the second housing are rotated away from respective rest states.

7. The torsion suspension assembly according to claim 1, wherein the biasing bodies each comprise a monolithic resilient body.

8. The torsion suspension assembly according to claim 1, wherein the first housing and second housing are made of relatively square section tubes of metal.

* * * * *